(12) United States Patent
McGowan et al.

(10) Patent No.: US 8,898,338 B1
(45) Date of Patent: Nov. 25, 2014

(54) TRAFFIC SHAPING FOR LIVE MEDIA STREAMING

(71) Applicant: Unicorn Media, Inc., Tempe, AZ (US)

(72) Inventors: Albert John McGowan, Phoenix, AZ (US); Niko Thomas John Huffman, Chandler, AZ (US); Nicholas Maultsby, Phoenix, AZ (US); Matthew A. Johnson, Tempe, AZ (US)

( * ) Notice: Subject to any disclaimer, the term of this patent is extended or adjusted under 35 U.S.C. 154(b) by 0 days.

(21) Appl. No.: 14/199,618

(22) Filed: Mar. 6, 2014

(51) Int. Cl.
*G06F 15/16* (2006.01)
*H04L 29/06* (2006.01)
*H04L 12/54* (2013.01)
*H04L 12/869* (2013.01)

(52) U.S. Cl.
CPC ........... *H04L 65/607* (2013.01); *H04L 12/5693* (2013.01); *H04L 47/58* (2013.01)
USPC .......................................................... 709/248

(58) Field of Classification Search
CPC ....................................................... H04L 47/58
USPC .......................................................... 709/248
See application file for complete search history.

(56) References Cited

U.S. PATENT DOCUMENTS

| | | |
|---|---|---|
| 8,145,782 B2 | 3/2012 | McGowan et al. |
| 8,301,733 B2 | 10/2012 | McGowan |
| 8,327,013 B2 | 12/2012 | McGowan et al. |
| 2011/0264506 A1 | 10/2011 | Grant et al. |
| 2013/0219428 A1 | 8/2013 | Jennings et al. |
| 2013/0317919 A1 | 11/2013 | Raman et al. |

*Primary Examiner* — Adnan Mirza
(74) *Attorney, Agent, or Firm* — Kilpatrick Townsend & Stockton LLP

(57) ABSTRACT

Methods and systems are disclosed for providing live media streaming over a communication network. Timing data of a received live media stream is mapped to time values from a system clock. Offset time values are assigned to a plurality of clients requesting live media content. The time values and the offset time values are used for transmission of the media stream.

18 Claims, 10 Drawing Sheets

TRAFFIC SHAPING FOR LIVE MEDIA STREAMING

CROSS-REFERENCES TO RELATED APPLICATIONS

This application is related to concurrently filed patent application U.S. patent application Ser. No. 14/199,610 entitled "Clock Locking For Live Media Streaming," which is incorporated by reference herein in its entirety.

BACKGROUND OF THE INVENTION

This disclosure in general relates to, but is not limited to, cloud-based computer processing, chunking and indexing of media files for use in media streaming, and coordinating timing of media streaming over a data communication network with an end user device.

The delivery of media content (such as video or audio) to end user devices over data communication networks such as the Internet is in high demand. The delivery of media over such networks may be accomplished in many ways, including progressive downloading or streaming. Streaming is often preferred to progressive downloading because it offers additional features such as content protection and the ability to seek undownloaded parts of a media file. The process of preparing a media file or media stream for streaming delivery to an end user device typically involves "chunking" the file, that is, dividing files into smaller segments for delivery. Information about the segments, such as where segments may be accessed, may be stored in an index file (also called a manifest). One type of index file is a client manifest, which may be sent to a client, such as a media player application in an end user device, for use in streaming delivery.

In one exemplary configuration a media provider may supply the media content to a hosting service for distribution to one or more end user devices (such as a video capable cellphone or a television screen) over a network. If the media content has been created in its entirety (e.g. a previous year's movie), the content may be stored by the hosting service in a variety of file sizes and formats for efficient delivery to the end user devices.

Delivery of live media content (such as a sporting event as it occurs) presents a variety of problems. Such problems may include synchronization and coordination, transmission load balancing, and modifying the media appropriately for streaming delivery to various types of end user devices. Received live media may have timing data embedded in a variety of formats, or the timing data may not correlate with the actual time either of reception or of transmission. Multiple end user devices requesting the same live media at the same time may create problems for the delivery equipment. Various end user devices may be able to receive, in real time, only reduced versions of the live media stream received at a provider.

The embodiments disclosed herein address these and other problems.

BRIEF SUMMARY OF THE INVENTION

This Summary does not limit in any way the scope of the claimed subject matter.

Methods and systems are disclosed for providing live media streaming to one or more clients via a data communications network. The methods and systems may be used as part of a larger media servicing network that can be used for, among other things, processing live media content received from media service providers, and providing the processed live media content to a Media File Delivery Service Provider (MFDSP) for delivery to clients. The methods and systems may implement the live media streaming by organizing live media content into component segments, also called chunks, for processing and delivery. The segments may make use of a system clock in the processing and delivery of the segments.

In one aspect, a method for providing live media streaming via a data communications network comprises receiving a stream of data representing live media content, comprising a plurality of source segments, and accessing timing data for the source segments. The method creates a mapping that provides an association of the timing data of the received plurality of source segments to time values obtained from a system clock; the mapping associates the timing data of each of the received plurality of source segments to the time value of the system clock at the time the source segment was received. The method also comprises: transcoding the received plurality of source segments to form transcoded segments and storing the transcoded segments in memory; receiving requests from a plurality of clients to obtain the live media content; assigning a respective offset time value to each of the plurality of clients, with at least two offset time values being different; forming, for each client, a respective client manifest based on the offset time value assigned to the client that comprises information that enables the client to obtain requested segments of the live media content; and sending the client manifest to the client via the data communications network.

In additional and/or alternative embodiments, the information in each client manifest enables the respective client to obtain requested segments that have time values according to the mapping that are offset from the value of the system clock by the respective offset time value assigned to the respective client. The information in the client manifest may comprise information that enables the respective clients to obtain the requested segments for the requested live media content from a media file delivery service provider (MFDSP).

In additional and/or alternative embodiments, the method may comprise any combination of following. A client manifest may be sent to at least one of the plurality of clients using an application program interface. Requested segments may be obtained from at least one client manifest and stored at the MFDSP. A client manifest formed for a first client of the plurality of clients may be formed by retrieving a stored client manifest that was formed for a second client of the plurality of clients. In response to a request from the MFDSP, a requested segment may be formed from at least one stored transcoded segment and sent to the MFDSP.

In another aspect, a server system is disclosed for providing live media streaming via a data communications network, the server system comprising one or more processors and memory comprising instructions. The instructions, when executed by the one or more processors, cause the combination of processors to: receive a stream of data representing live media content, the stream of data comprising a plurality of source segments; access timing data of each of the received plurality of source segments of the stream of data; create a mapping that provides an association of the timing data of the received plurality of source segments to time values obtained from a system clock, wherein the mapping associates the timing data of each of the received plurality of source segments to the time value of the system clock at the time the source segment was received; transcode the plurality of received source segments to form transcoded segments and store the transcoded segments; receive requests from a plurality of clients to receive live media content; assign a respective offset time value to each of the plurality of clients, wherein at least two offset time values are different; form, for each client of the plurality of clients, a respective client manifest based on the offset time value assigned to the client, the respective client manifest enabling the client to obtain requested segments of the live media content; and send the client manifests to the respective clients via the data communications network.

In additional and/or alternative embodiments, the server system for providing live media streaming via a data communications network may comprise any combination of the following. The information in each client manifest may enable the respective client to obtain requested segments that have time values according to the mapping that are offset from the value of the system clock by the respective offset time value assigned to the respective client. The client manifests may comprise information that enables the respective clients to obtain the requested segments for the requested live media content from a media file delivery service provider (MFDSP). The offset time values may be assigned so that processing needed by the MFDSP to provide the requested segments is reduced. The client manifest may be sent to at least one of the plurality of clients using an application program interface. Requested segments obtained from at least one client manifest may be stored at the MFDSP. A client manifest formed for a first client of the plurality of clients may be implemented by retrieving a stored client manifest that was formed for a second client of the plurality of clients. A requested segment may be formed in response to a request from the MFDSP from at least one stored transcoded segment and sent to the MFDSP.

In another aspect, a computer program product embodied on a non-transitory computer-readable medium is disclosed. The computer-program product comprises code that, when executed, causes one or more processors to: receive via a data communications network a stream of data representing live media content, the stream of data comprising a plurality of source segments; access timing data of each of the received plurality of source segments of the stream of data; create a mapping that provides an association of the timing data of the received plurality of source segments to time values obtained from a system clock, wherein the mapping associates the timing data of each of the received plurality of source segments to the time value of the system clock at the time the source segment was received; transcode the received plurality of source segments to form transcoded segments and storing the transcoded segments in memory; receive requests from a plurality of clients to receive live media content; assign a respective offset time value to each of the plurality of clients, wherein at least two offset time values are different; form, for each client of the plurality of clients, a respective client manifest based on the offset time value assigned to the client, the respective client manifest comprising information enabling the client to obtain requested segments of the live media content; and send the client manifests to the respective clients via the data communications network.

In additional and/or alternative embodiments, the computer program product may comprise any combination of the following. The information in each client manifest may enable the respective client to obtain requested segments of the live media content from a media file delivery service provider (MFDSP), and the respective offset time values may be assigned so that the processing needed by the MFDSP to provide the requested segments is reduced. The code may cause the combination of processors to form a client manifest for a first client of the plurality of clients by retrieving a stored client manifest that was formed for a second client of the plurality of clients. The code may cause the combination of processors, in response to a request from the MFDSP, to form a requested segment from at least one stored transcoded segment, and send the formed requested segment to the MFDSP.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing various embodiments of the invention. It is understood that various changes may be made in the function and arrangement of elements without departing from the spirit and scope as set forth in the appended claims.

The increased availability of media content over data communications networks such as the Internet has mirrored the increased bandwidth for these networks. Because media has recently taken a more prominent role in data communications, the distribution of media and the data associated with such distribution has become increasingly important, particularly to media content providers. While bandwidth available for media streaming has increased, nevertheless it is still quite possible for requests to receive media, especially live video streaming, to excessively burden a media content provider's distribution system. Further, it is always desirable to improve the efficiency of providing media streaming.

Some embodiments disclosed relate to methods, systems and computer readable media for receiving live media streaming from a source, and delivering the media efficiently over a communication network. In one exemplary situation, a live video image stream may be produced at a sporting event, and transmitted by the copyright owner of the video image stream over a communication network, such as the Internet, to another entity for live distribution to display devices of multiple end consumers. It is possible for the various end user devices of the consumers to start and stop receiving the live media stream at different points in the stream. A goal of live streaming of media is that the media stream be sent to consumers within a short time of the generation of the media stream. So methods and systems that can handle varying demands and that can efficiently coordinate delivery of the media stream to multiple consumers would be advantageous.

It is to be noted that, although embodiments disclosed herein describe techniques as implemented by a cloud-hosted integrated multi-node pipelining system (CHIMPS) 110, the embodiments are not so limited. Other systems may be configured to implement the techniques disclosed. Although techniques described herein are often described in the context of video streaming, they can be applied to other forms of media content (e.g., audio streaming) as well. A person of ordinary skill in the art will recognize many alternate applications.

Figure 1:
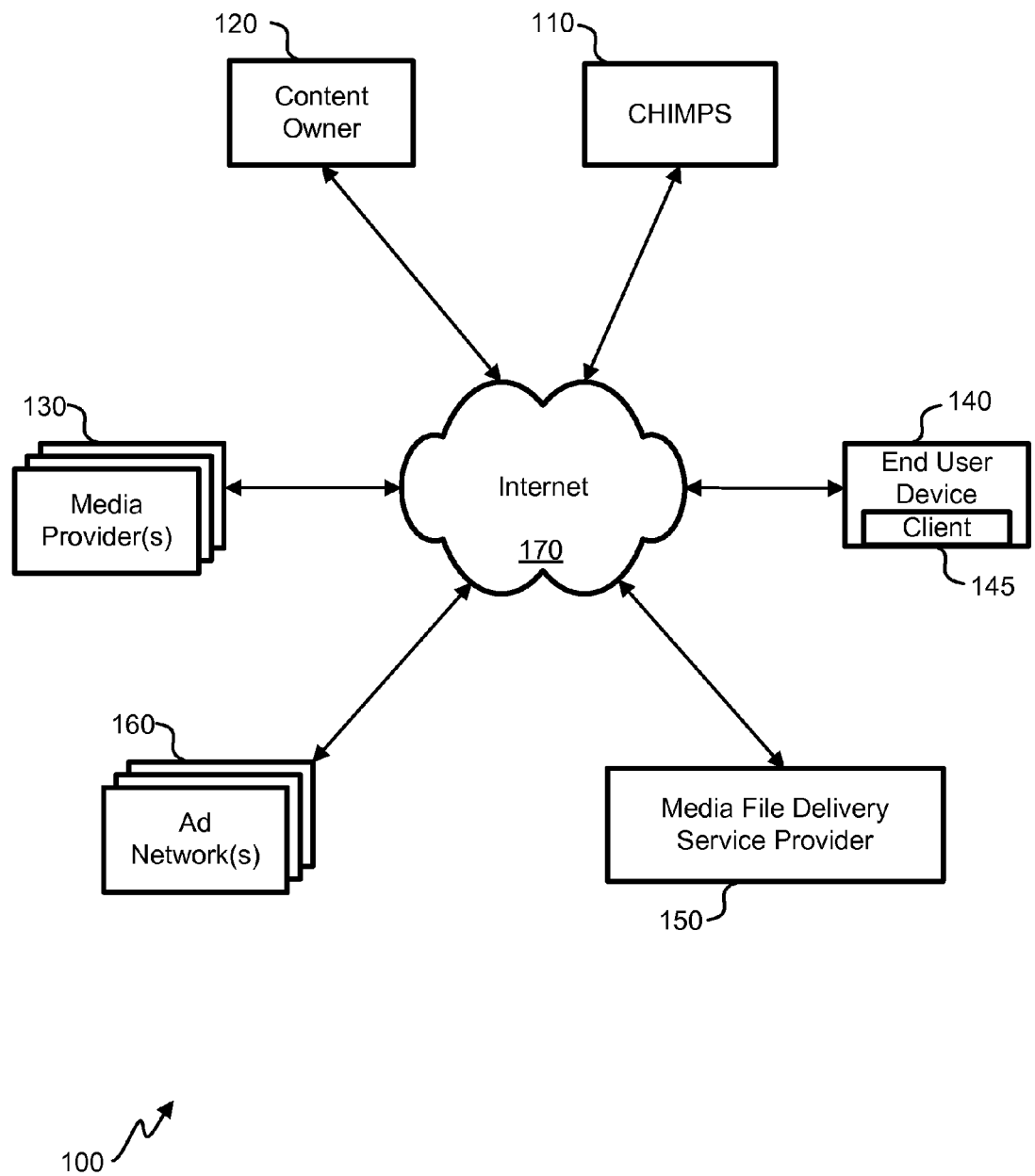
FIG. 1 is a block diagram illustrating a media servicing system, according to one embodiment of the present invention.

FIG. 1 is a block diagram illustrating a Media Servicing System 100, according to some embodiments of the present invention. The System 100 may deliver media content to a Client 145, executed by an End User Device 140 providing media playback to an end user. The Client 145 can be, for example, a media player, browser, or other application adapted to request and/or play media files. The media content can be provided via a network such as the Internet 170 and/or other data communications networks, such as a distribution network for television content. The End User Device 140 can be one of any number of media receiving devices configured to receive media over the Internet 170, such as a mobile phone, tablet, personal computer, portable media device, set-top box, video game system, etc. Although only one Client 145 and one End User Device 140 are shown in FIG. 1, it will be understood that the Media Servicing System 100 can provide media to many (hundreds, thousands, millions, etc.) of Clients 145 on many (hundreds, thousands, millions, etc.) of End User Devices 140.

For on-demand content (e.g., requested media that is stored in its entirety), a media file provided by one or more media providers 130 can be processed and indexed by a cloud-hosted integrated multi-node pipelining system (CHIMPS) 110. The media file may be stored by a media file delivery service provider (MFDSP) 150, such as a content delivery network, media streaming service provider, cloud data services provider, or other third-party media file delivery service provider. Additionally or alternatively, the CHIMPS 110 may also be adapted to store the media file. Media content can be provided to the Client 145 via progressive downloading and/or streaming.

For live content (e.g., requested content that is sent to one or more End User Devices 140 as it is received from media provider(s) 130, that is, in real time or near real time, depending on processing times and/or other buffer times), a similar process can take place. For example, media provider(s) 130 can provide a media stream (e.g., live video), which is processed and indexed by the CHIMPS 110. The resulting transcoded segments (also referred to as "chunks") of the media stream may be stored as files on the media file delivery service provider (MFDSP) 150 and/or CHIMPS 110. Embodiments may have a delay from the time the media stream is received to the time the associated content is stored and made available for media streaming to the one or more End User Devices 140. The delay can be due to transcoding and/or other types of processing for making the received media stream available for downloading. This delay can create a buffer period of time in which one or more of the techniques described herein can take place. However, the techniques may limit the buffer period of time so that an End User Device 140 may receive the live content in near real time.

Delivery of live media content by media streaming can utilize any of a variety of techniques. As referred to above, one such method is segment-based media streaming in which a media file or live stream is processed into smaller segments and stored (e.g., in a server of the CHIMPS 110 or Media File Delivery Service Provider 150) for serving to a Client 145. A Client 145 may be a media interface program such as web browser or other playback program. The Client 145 may reside in an End User Device 140, for example, a cellphone, desktop or laptop computer, a tablet, a gaming system, a personal media player, or a set top box interfaced with a display device (e.g. a large television). The Client 145 can make a request to the CHIMPS 110, which can provide a manifest file (also known as an index file) indicating the locations of each of the segments of live media content using, for example, Uniform Resource Indicators (URIs), Universal Resource Locators (URLs) or other indicators. The Client 145 can then use the information in the manifest file to stream the media content, following one location after the other to download each transcoded segment of live media content.

The CHIMPS 110 can further manage the processing and syndication of media (live or on-demand) received from the media provider(s) 130. For example, the CHIMPS 110 can provide transcoding and other services to enable media provided by the media provider(s) to be distributed in a variety of formats to a variety of different device types in a variety of locations. Further, the CHIMPS 110 can provide feedback to the media provider(s) 130 regarding the media's syndication, including user behavior during media streaming. For example, the CHIMPS 110 can provide a media provider 130 with information indicating that end users tend to stop watching a video at a certain point in playback. With this data, media provider(s) 130 can adjust factors such as media content, advertisement placement and content, etc., to increase revenue associated with the media content and provide the End User Device 140 with a more desirable playback experience. Additionally or alternatively, the CHIMPS 110 can dynamically provide a customized playback experience on the End User Device 140 according to aspects of the context associated with the content at the time of the request, aspects of the content request itself, or both. It is to be understood that although embodiments herein may utilize media files and live streams explicitly, other embodiments may utilized other forms of media assets, such as dynamic web pages, and may incorporate multiple media elements, including players, user interface components, user controls and control components, images, and other media content, objects, or types. Additionally, it is to be understood that various functions, operations, processes, or other aspects that are described in this example, and other examples, as being performed by or attributable to the CHIMPS 110 can be performed by another system operating in conjunction with the CHIMPS 110, loosely or tightly synchronized with the CHIMPS 110, or independently. For example, collecting data from other digital services to be combined and reported with data collected by the CHIMPS 110 can, in some implementations, be performed by a system other than the CHIMPS 110. Additional details regarding the functionality of the CHIMPS 110 can be found in: U.S. Pat.

No. 8,301,733, entitled "Dynamic Chunking for Delivery Instances," U.S. Pat. No. 8,145,782, entitled "Dynamic Chunking For Media Streaming," and U.S. Pat. No. 8,327,013, entitled "Dynamic Index File Creation For Media Streaming," which are incorporated by reference herein in their entirety.

A content owner 120 can utilize one or more media provider(s) 130 to distribute media content owned by the content owner 120. For example, a content owner 120 could be a movie studio that licenses distribution of certain media through various media content providers 130 such as television networks, Internet media streaming websites and other on-demand media providers, media conglomerates, and the like. In another example a content owner 120 may be a sports television network whose cameras are capturing a live sporting event, and the media providers could be an Internet service provider. In some configurations, the content owner 120 also can operate as a media provider 130.

The Content Owner 120 and/or Media Provider(s) 130 can enter into an agreement with one or more Ad Network(s) 160 to provide advertisements to numerous Clients 145 on numerous End User Devices 140. In this manner, the Ad Network(s) 160 allow companies to show advertisements to end users viewing the media content from the Media Provider(s) 130. Because Ad Network(s) 160 can maintain advertisements and/or advertisement data separate from media content, the advertisements can be updated and subject to business rules such that two users viewing the same media content at different times and/or in different locations may see different advertisements.

Additional and/or alternative embodiments of the Media Servicing System 100 are now described that include structures and techniques to efficiently implement live streaming delivery of media content.

Figure 2:
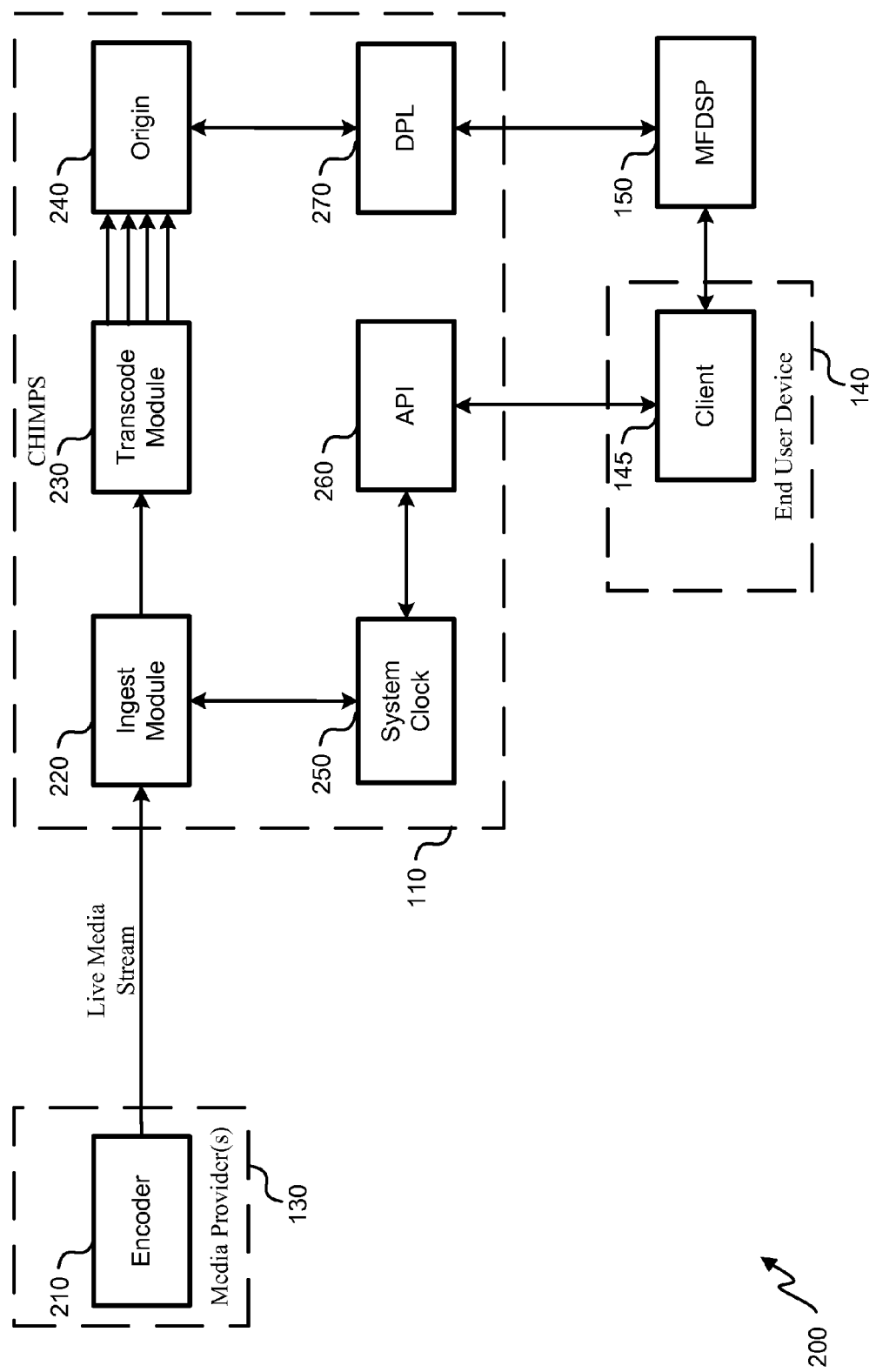
FIG. 2 is block diagram illustrating a system configured to provide live media streaming according to one embodiment.

FIG. 2 is functional block diagram illustrating a Media Streaming System 200 configured to provide live media streaming, including time mapping techniques described below, according one embodiment. Though described for providing live media streaming, it will be apparent to a person of ordinary skill in the art that the embodiments may be modified and used to provide streaming of recorded media. The Media Streaming System 200 can comprise a Client 145, MFDSP 150, Application Programming Interface (API) 260, Dynamic Permutation Layer (DPL) 270 Origin 240, Transcode Module 230, System Clock 250, Ingest Module 220, System Clock 250 and Encoder 210. As shown, these components can be executed by and/or incorporated into larger systems, such as the End User Device 140, CHIMPS 110, and/or Media Provider(s) 130 as shown in FIG. 1. In other embodiments, however, the illustrated components may be incorporated differently into a larger system and/or may be stand-alone components. Furthermore, other embodiments may combine, separate, add, omit, substitute, and/or modify components of the Media Streaming System 200, while providing the same overall functionality as described herein. A person of ordinary skill in the art will recognize many substitutions, additions, omissions, and other variations to the embodiments provided herein.

In the particular embodiment shown in FIG. 2, a live media stream is provided by the Encoder 210. In one embodiment, the Encoder 210 is operated by Media Providers 130. In an illustrative example the Media Provider 130 may be digitally filming a video of a sporting event, and the Encoder 210 converts the video frames to a digital format for transmission over the Internet. In general, the Encoder 210 may then also form the video data into segments, or source segments, of a duration that can be sent to and received by a CHIMPS 110.

In some particular embodiments, lengths of source segments may vary; in some embodiments the lengths may range in duration from less than one second to over 30 seconds, though other durations are possible. The source segments may be encoded to have a particular format of timing information, for example, a presentation time stamp (PTS). Because live media can vary widely in duration, PTS values for the live stream can vary correspondingly. Also, the timing information of the source segments may give only relative timing information, for example the elapsed time since the start of a transmission. The format of the timing information may depend on the Encoder 210 and Media Provider 130.

In the embodiment shown, the live media stream may be sent over the Data Communication Network 170 to CHIMPS 110, where the stream is received by an Ingest Module 220. The ingest module 220 may be implemented by a server or other computer system. In one embodiment the Ingest Module 220 is connected to a System Clock 250, which may provide time values in a known format to other components of the CHIMPS 110. The time values may be the true local time of the CHIMPS 110, standard GMT, or Internet time (as provided by one or more Internet sources), and the like. The Ingest Module 220 may also access the timing data and/or PTS of source segments received from the Encoder 210 and correlate that timing data with the time values of the System Clock 250. The source segments processed by the Ingest Module 220 are also termed ingested segments or received segments.

The Ingest Module 220 also may form a particular index file, called a source manifest, by recording the time values according to the System Clock 250 at which the ingested segments are received from the live media stream, and correlating the timing data of those ingested segments with the time values. This source manifest can then be used by other components, such as the API 260, to determine which ingested segment was received at a specific time value according the System Clock 250. Either the source manifest or a separate file can serve as a mapping giving the correlation between the time value of the arrival of a source segment and the timing data or PTS of that source segment. In one embodiment, the mapping serves to correlate a PTS of a source segment that uses times of a different time zone with time values from the System Clock 250 that is in a different time zone. In another illustrative example, the timing data of an ingested segment may give only an elapsed time since a start of a live sports event. The mapping could then correlated that timing data to the time values of the System Clock 250.

Ingested segments are then provided to the Transcode Module 230, which transcodes the ingested segments into various formats according to a variety of different media profiles. Media profiles may be determined by the bit rate, resolution, frame rate, and other media characteristics of the various types of networks used to stream the live content, and by the Clients 145, and/or End User Devices 140. For example, transcoded segments with lower bit rates are generally used to stream the live content to an End User Device 140 that has a poor network connection or low-resolution display, whereas transcoded segments with higher bit rates are generally used to stream the live content to an End User Device 140 that has a good network connection or high-resolution display.

The Transcode Module 230 may produce one or more transcoded segments from a single ingested segment. This may be done to produce transcoded segments of a different resolution, as noted above, or to create multiple transcoded segments. Multiple transcoded segments may be created from one ingested segment in order that streaming delivery of the transcoded segments would take less time, or that on playback at the End User Device 140 by the Client 145 each transcoded segment would take less time than if the Client 145 received a single transcoded segment created from the entire ingested segment.

Similarly, transcoding may use various compression techniques and combine multiple ingested segments into one transcoded segment. This may be done, for example, to facilitate streaming delivery when the CHIMPS 110 delivers media using a standard transcoded segment size or duration, but the ingested segments are of a different or smaller size or duration. In additional and/or alternative embodiments, this may facilitate incorporation of advertising with the transcoded segments in the delivery stream.

In the cases in which a collection of ingested segments are transcoded into a greater number of transcoded segments, or are combined into fewer transcoded segments, or are otherwise reorganized, the mapping between the timing data of the ingested segments and the corresponding time values may be used to create an updated mapping that gives an association between the timing data and time values of the transcoded segments. As an example, if an ingested segment of a video stream is simply reformatted to a lower resolution, but contains the same number of frames, the timing data (or PTS) of the ingested segment and the time value according to the System Clock 250 of when the ingested segment was ingested may still be associated by the mapping. But if ingested segments are recombined during transcoding, then timing data and associated corresponding time values of the ingested segments may be used to determine modified timing data and time values for the transcoded segments.

The various transcoded segments are stored in the Origin 240. The Origin 240 can be a data storage comprising one or more physical storage devices, which can be distributed geographically, and may be local to and/or remote from the Transcode Module 230 and/or DPL 270, depending on desired functionality. The Origin 240 can further store and/or manage an origin manifest that records the mapping between the timing data and the time values of the transcoded segments, and other information regarding the available media profiles of the stored transcoded segments. Thus, together with the source manifest, the origin manifest may be used to track the time at which each ingested segment of the live media stream is received and determine the available media profiles of the corresponding transcoded segment(s) stored in the Origin 240.

The Client 145 can send a request to the API 260 to receive content of the live media stream. The API 260, upon receiving the client's request, can create a client manifest (also known as an index file), comprising a list of links (e.g., universal resource locators (URLs) and/or other universal resource indicators (URIs)) of where a Client 145 can obtain segments of the live content. The segments in the client manifest are referred to herein as "requested segments." The requested segments may formed by formatting, combining, splitting and/or otherwise manipulating transcoded segments. Once the Client 145 receives the client manifest from the API 260, the Client 145 can use the links to obtain requested segments from the MFDSP 150. If a requested segment is not already cached at the MFDSP 150, the request can be relayed to the DPL 270, which can dynamically create the requested segment (e.g., at runtime) by retrieving and/or combining one or more corresponding transcoded segments stored at the Origin 240. The DPL 270 can then relay the requested segment(s) back to the MFDSP 150, which can then provide the requested segment to the Client 145. Because the DPL 270 can create requested segments dynamically upon request, the requested segments can be customized according for each client. For example, although transcoded segments stored at the Origin 240 may comprise five-second segments of the live content, a Client 145 may use a link provided in a client manifest to obtain a 20 second requested segment. In this case the DPL 270 can retrieve a plurality of five-second transcoded segments from the Origin 240 corresponding to the requested 20-second segment, dynamically create the requested segment by combining the plurality of five-second transcoded segments, and provide the requested segment to the MFDSP 150. In another example, the DPL may create a 10-second segment requested by a client from a three consecutive 4-second segments by combining the last 3 seconds of the first segment, the entire second segment and the first three seconds of the last segment. In a third example, the DPL may pass a transcoded segment directly to the client, if the client-requested segment matched the transcoded segment exactly. Because the API 260 creates the client manifest used by the Client 145 to request segments, the API 260 can determine which requested segments are provided in the client manifest. The API 260 can therefore craft client manifests to dictate at what time point in the live content that Clients 145 will begin receiving, and the length of the segments that each Client 145 receives.

By using the mapping of timing data and time values of the transcoded segments, and/or accounting for potential loads on the MFDSP 150, the API 260 may include in the client manifest requested segments that have an offset time value from the time value of the System Clock 250. This may be performed according to following method.

Figure 3:
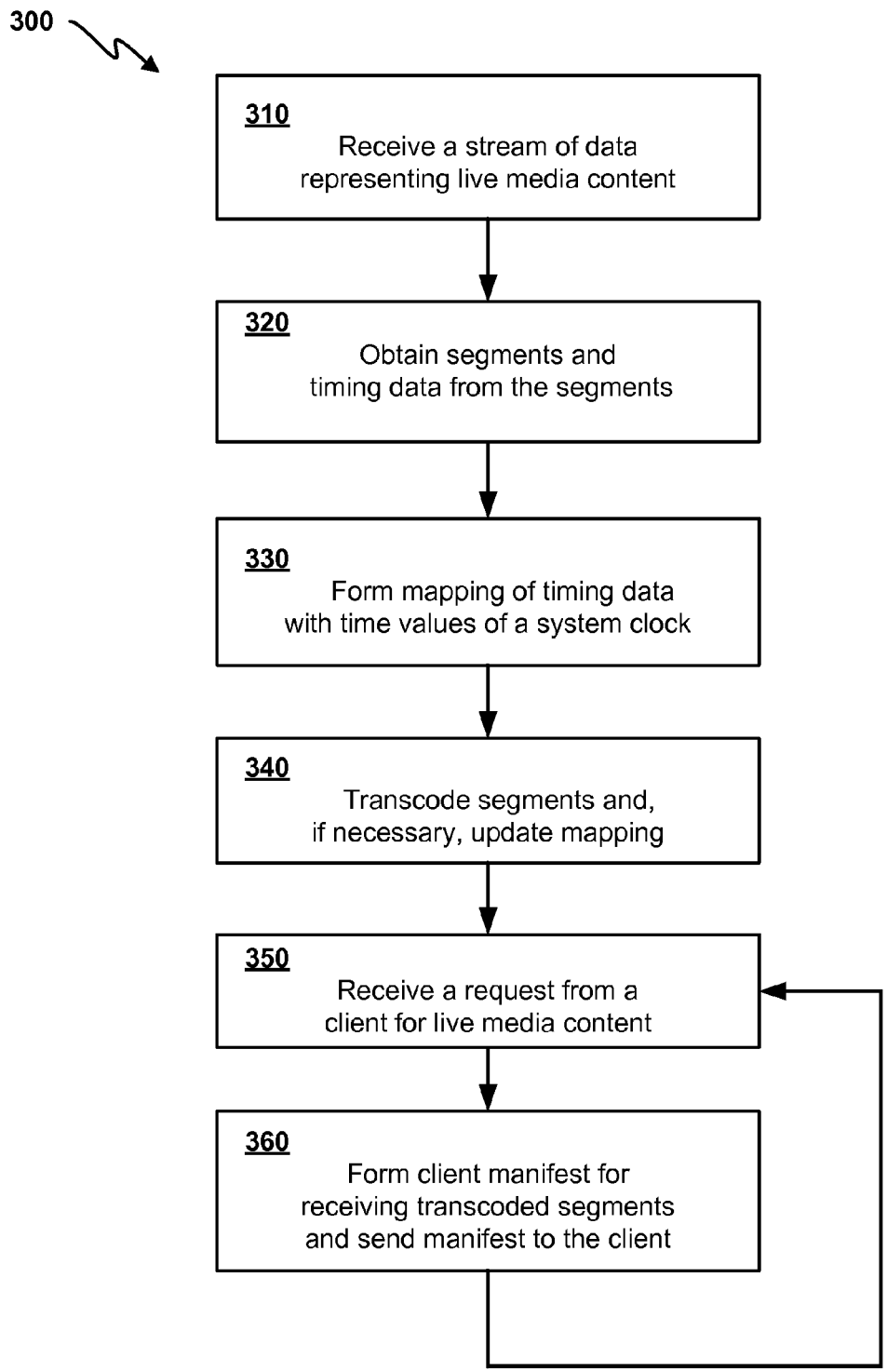
FIG. 3 is flow chart of a method for delivering a media stream by establishing coordinated time values, according to one embodiment.

FIG. 3 is a flow chart showing an exemplary method of providing live media content within, in one embodiment, the system illustrated in FIG. 2. A data stream representing live media content is received at block 310, such as by an Ingest Server 220, from a source, such as a Media Provider 130. The data stream may comprise a plurality of source segments of possibly varying durations. The source segments may comprise timing data, which may be in a format specific to the Encoder 210 of the Media Provider 130.

At block 320, the timing data of the received source segments is obtained from the information contained in the source segments and/or data stream. As discussed above, since the timing data may not have a standard format, or for other reasons, time values according to a System Clock 250 are also obtained to give the time (according to the System Clock 250) at which various source segments were received.

A mapping or association between the timing data obtained from the ingested segments and the time values is then formed at block 330. The mapping may provide an association of the timing data of the received segments to time values obtained from a System Clock 250, and the mapping associates the timing data of each the plurality of ingested segments to the time value of the System Clock 250 at the time the ingested segment was received. The mapping may be stored or recorded in a separate file. Additionally and/or alternatively, the mapping may be stored in a source manifest, which may also comprise other information about the ingested segments, such as duration, digital format, and the like. The mapping may be created by the Ingest Server 220, or by other components of the System 200.

With the information of the mapping available, the ingested segments may be processed, at block 340, by transcoding them to produce new segments (e.g., transcoded segments). In some cases no change to the ingested segments is needed. In other cases the ingested segments are modified, for example to allow efficient distribution. Non-limiting examples of the modifications effected by transcoding may include changing file formats of the ingested segments, performing signal processing on the media content (such as image compression or error correction decoding), subdividing a ingested segment into more than one transcoded segments, or combining more than one ingested segments into a single transcoded segment. Transcoding may be performed to create and store multiple transcoded segments, comprising the same media content as the original ingested segments, but with different media profiles to allow for more efficient streaming of the transcoded segments to media receiving devices of different resolution and/or reception speeds.

As part of the transcoding process, the mapping of timing data of the original ingested segments and the time values from the System Clock 250 may be preserved. In the cases of combining or subdividing of the ingested segments, the information in the mapping may be interpolated so that the transcoded segments each have a corresponding time value and timing data. In some embodiments the time value associated to a transcoded segment is calculated from the time of reception according to the System Clock 250 of the transcoded segment. In additional and/or alternative embodiments, the time value associated to a transcoded segment may be extrapolated from timing data of an ingested segment (e.g. a PTS) in addition to time values of the System Clock 250. The information in the mapping may be updated after the ingested segments are transcoded.

The transcoded segments may be stored for rapid distribution to media receiving devices. In one embodiment, storing is done at an Origin 240, which may comprise servers and memory and/or physical storage media. The mapping may also be stored with the transcoded segments. The mapping information may be part of a single file, or it may be part of a type of index file called an origin manifest. The origin manifest may comprise information about the transcoded segments, for example data format or duration on playback, as well as the time value and timing data from the mapping.

According to one embodiment of the method 300, at block 350, the CHIMPS 110 may receive a request sent from a Client 145 within an End User Device 140, or directly from an End User Device 140. The request may be received by the API 260. The request comprises information that the Client 145 is seeking to receive a portion of the live media content of the live media stream being received at the CHIMPS 110. The request may also comprise information regarding the desired duration, the desired format, the desired resolution or other information of the live media content to be received by the Client 145 that may assist the CHIMPS 110 in meeting the request. As illustrative examples, a video-capable cellphone may request a 10-second-long portion of a video stream at a low resolution, reflecting its processing capacity, whereas a set top box in a sports bar may request a 30-second-long portion of the video stream at high resolution due to a much higher video processing capacity. Further, a device's capabilities may change with time, so that requests from a device may reflect that changed capabilities. For example, a cellphone may move into an area of stronger signal, or may halt simultaneously running programs, and so be able to request segments that are longer or at higher resolution.

In response to a request from a Client 145, at block 360, the API 260 and/or other components of the CHIMPS 110 forms a client manifest to send to the Client 145. The client manifest comprises information that the Client 145 uses to obtain transcoded segments of the live media. In one embodiment, the client manifest comprises a list of links to at least one location on the data communications network from which the Client 145 may receive the actual transcoded segments. In one exemplary embodiment, the links in the manifest are Internet URLs of sites that store transcoded segments. Upon accessing the sites, the transcoded segments are sent to the Client 145.

After formation of the client manifest, the CHIMPS 110 can send the manifest to the Client 145. In one embodiment, the Client 145 and/or End User Device 140 then uses information in the client manifest to obtain transcoded segments of the live media content from an MFDSP 150. In one embodiment, the MFDSP 150 itself has the requested segments stored, and sends them to the Client 145. In additional and/or alternative embodiments, if the MFDSP 150 does not have particular requested segments stored, it may send a request to the DPL 270 of the CHIMPS 110. The DPL 270 may then form the requested segments from the transcoded segments stored at the Origin 240, and send the requested segments to the MFDSP 150 for the MFDSP 150 to send to the Client 145.

In additional and/or alternative embodiments, the client manifest may comprise information about the time values of the System Clock 250 given by the mapping for the requested segments in the list. The Client 145 may use the information to assist in obtaining the requested segments from the MFDSP 150. In one exemplary embodiment, using time values obtained from the client manifest enables the MFDSP 150 and/or the DPL 270 to use a common system for forming the requested segments from the transcoded segments.

In additional and/or alternative embodiments, the CHIMPS 110 may receive a subsequent request from the Client 145 for live media content. The subsequent request may be from the Client 145 to obtain the live media content that follows the live media content contained in requested segments listed in the previous client manifest. In such embodiments, the CHIMPS 110 may form a subsequent client manifest comprising a list of links that enable to the Client 145 to receive requested segments of the subsequent live media.

In additional and/or alternative embodiments, the client manifest may comprise information about the original timing data obtained from the ingested segments and recorded with the transcoded segments. In such embodiments, either the MFDSP 150 or the DPL 270 may use the mapping to determine corresponding time values for the requested segments, and use the time values to form the requested segment.

The embodiments disclosed above may be used by the CHIMPS 110 to respond to a request from at least one Client 145 to receive live media content. Because of possible processing time internal to CHIMPS 110 from ingestion to making transcoded segments available, there may be advantages to offsetting in time the live media content delivered to a Client 145 from time at which the content was ingested. One advantage is that requested segments listed in a sent client manifest may be available at the MFDSP 150, or from the DPL 270, when the Client 145 uses the information in the client manifest to obtain the requested segments. Other advantages will be discussed below. By using rapid processing, the CHIMPS 110 may be able to process ingested segments and form client manifests using offset time values so that the media content supplied to the Client 145 is close to real time for the end user.

Figure 4:
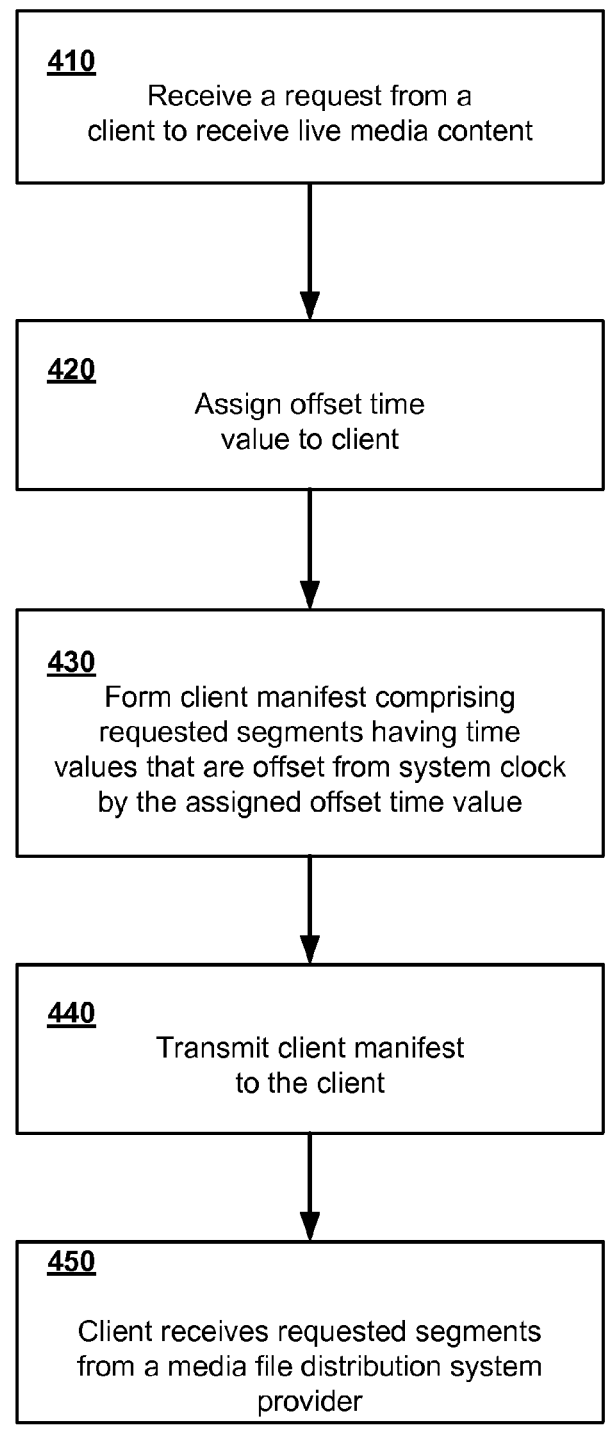
FIG. 4 is a flow chart of a method of delivering a media stream using coordinated time values and client manifests, according to one embodiment.

FIG. 4 is a flow chart of a method 400 of providing live media streaming to a Client 145 and/or an End User Device 140, according to one aspect of the invention. The exemplary method disclosed in FIG. 4 may be used in responding to a single Client 145 or to multiple Clients 145 making requests at nearly the same time. The CHIMPS 110, at block 410, receives a request from a Client 145 for a portion of live media content. In one embodiment the request is received by the API 260.

According to embodiments of the method, to each one of the Clients 145 that sends a request for live media content, at block 420 an offset time value is assigned. In some cases it may be that an offset time value of zero seconds is assigned to a Client 145. For example, the CHIMPS 110 may be capable of ingesting and transcoding the received media stream within the time needed to receive a request and form a client manifest. In other cases, an offset time value is assigned to the Client 145 for use in forming one or more client manifests in response to one or more requests from the Client 145. In one aspect, the offset time value assigned to the Client 145 is used throughout the client's link to the CHIMPS 110 for live media streaming.

Using the offset time value, in one aspect in response to a request from the Client 145, a client manifest is formed, at block 430, as disclosed above, only the requested segments listed in the client manifest are based on the offset time value assigned to the Client 145. The client manifest is then sent, at block 440, to the Client 145. The Client 145 receives, at block 450, the client manifest and, as disclosed above receives the requested segments from a MFDSP 150.

As a non-limiting example, a request from a Client 145 to begin receiving live media content is received at the CHIMPS 110 when the System Clock 250 reads 1:00:00. In a perfect situation, the CHIMPS 110 would instantaneously be able to supply the media stream it is receiving to the Client 145. However, to allow for transcoding and client manifest formation durations, the Client 145 may be assigned an offset time value of 2 seconds. The client manifest would contain a list of links for requested segments, with the initial requested segment of the client manifest corresponding to a time value (of the System Clock 250) of 12:59:58. Such a segment could already have been ingested, transcoded and stored (either at the Origin 240, or at the MFDSP 150) for delivery to a Client 145. Assuming zero delay in forming and delivering the client manifest, and zero delay in the Client 145 signaling the MFDSP 150 for the requested segments, the MFDSP 150 would be able to supply the requested segments to the Client 145. To the Client 145 it would seem that the media content is being received exactly live, but in reality there would be a 2 second offset. The CHIMPS 110 and/or MFDSP 150 could continue to supply requested segments, for the subsequent requests from the Client 145, using the offset time value so that no interruptions due to processing delays would be noticeable to the Client 145 or End User Device 140.

In one embodiment, one offset time value is assigned to the Client at the start of a session in which the Client 145 sends requests to the CHIMPS 110, and the assigned offset time value is maintained for the Client 145 until its session of requesting/receiving live media content ends. Using only a single offset time value throughout a session reduces difficulties associated with coordinating, synchronizing and organizing segments received at the Client 145 if they were created using different offset time values. But in additional and/or alternative embodiments, a person of ordinary skill in the art will recognize that the technology and processing capabilities of the Client 145 may permit the offset time value to be changed dynamically in a single session with the CHIMPS 110. Such dynamic changes may permit bringing the Client 145 closer to true live reception, adjusting for the number of connected users, and adjusting for slowness or gaps in the source ingest.

In some embodiments, the same offset time value is assigned to each Client 145 making a request for live media content. As disclosed below, in additional and/or alternate embodiments, a different offset time value may be applied to at least two Clients 145.

A Client 145 or an End User Device 140 may need time to process the requested segments received from the MFDSP 150. If the client manifest had contained an extensive list of requested segments for the Client 145 to obtain, receiving and processing all of them for display on an End User Device 140 could possibly introduce undesirable delays. The following embodiments disclose methods and systems that may be used to solve or mitigate this potential problem.

Figure 5:
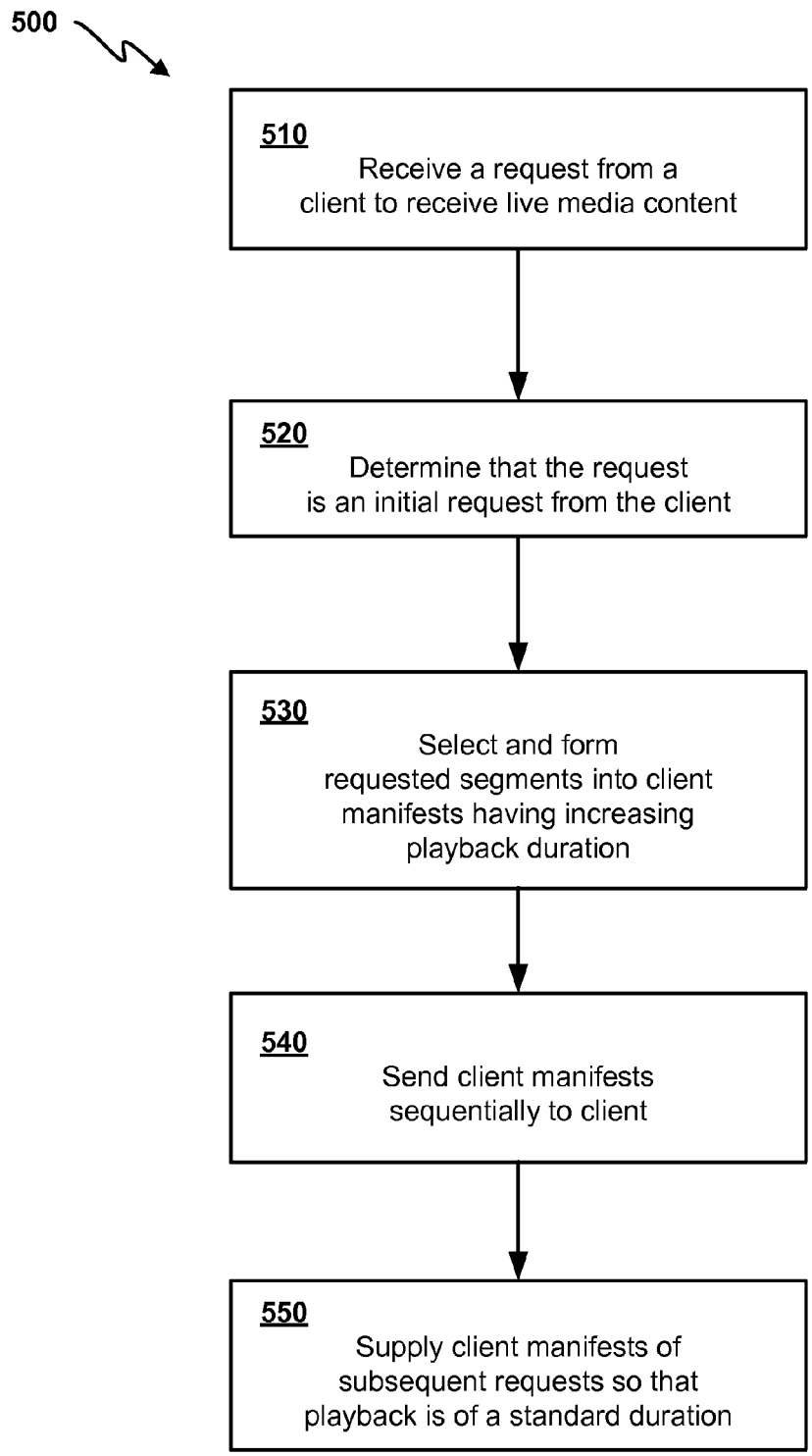
FIG. 5 is a flow chart of a method of delivering a media stream by segments of increasing playback duration, according to one embodiment.

FIG. 5 is a flow chart of an exemplary method 500 by which a CHIMPS 110 may initiate streaming of live media content to a Client 145. The method disclosed in FIG. 5 modifies the method of FIG. 4 to facilitate providing live media content to a Client 145 that sends an initial request. As disclosed above, the method begins, at block 510, when a request from a Client 145 for live media content is received.

The CHIMPS 110 may determine at block 520 that the request is an initial request from a Client 145 to start obtaining live media content. In additional and/or alternative embodiments, that a request is an initial request from a Client 145 is determined directly by the CHIMPS 110. In some embodiments, an offset time value is assigned to the Client 145, as disclosed above.

In response to a request determined to be an initial request, the CHIMPS 110 may form, at block 530, a plurality of client manifests for sending to the Client 145. The plurality of manifests may be arranged in a sequence so that when the requested segments listed in each client manifest are received, processed and output to an End User Device 140, the media content obtained from each client manifest occurs in non-decreasing durations. In one embodiment, such a sequence of client manifests is able to be created because during transcoding, multiple transcoded segments are created that, on output on an End User Device 140, would have a single fundamental duration. Then each of the client manifests is created using the sufficient quantities of such transcoded segments to form the requested segments so that the playback by the End User Device would have increasing durations.

The client manifests are then sent, at block 540, to the Client 145 so that the Client 145 can obtain the live media content. In the case that the first client manifest received by the Client 145 comprises fewer links to transcoded segments, the Client 145 is able to obtain, process and output the live media content of the transcoded segments more. This allows the Client 145 to "ramp-up" output so that the consumer using the End User Device 140 does not experience an undesirable delay in beginning to receive the live media.

Outputting the media content obtained using the first client manifest may require a time interval of such duration that the Client 145 may receive a second client manifest in that time interval. The second client manifest may contain links to more transcoded segments than were in the first client manifest. The requested segments of the second client manifest may also be obtained and processed for display while the media content of the first client manifest is being output. When outputting the media content from the first client manifest is completed, the Client 145 is able to continue outputting the media content obtained using second client manifest without pausing.

Continuing, the sequence of client manifests can allow the Client 145 to obtain, and prepare for output, the media stream using one client manifest while the media stream of the previous manifest is being displayed or output. The sequence of client manifests supplied 550 to a Client 145 may allow for outputs of the media stream of increasing durations until the Client 145 is has built up enough buffer of obtained requested segments that it is able to receive client manifests whose playbacks have a standard duration. Thereafter, at block 550, the CHIMPS 110 may then provide client manifests in response to further requests such that the output of the media stream has a standard duration.

While the embodiments just disclosed presume having outputs of increasing durations, it will be clear to one of skill in the art that this is a preferred but not required property. It may be, depending on processing times needed at the CHIMPS 110 or at the MFDSP 150, that the sequence of client manifests received by Client 145 may be such that the output duration of requested segments obtained from one client manifest is the same as, or even shorter than, the duration of the output of the requested segments from a prior client manifest.

Figure 6:
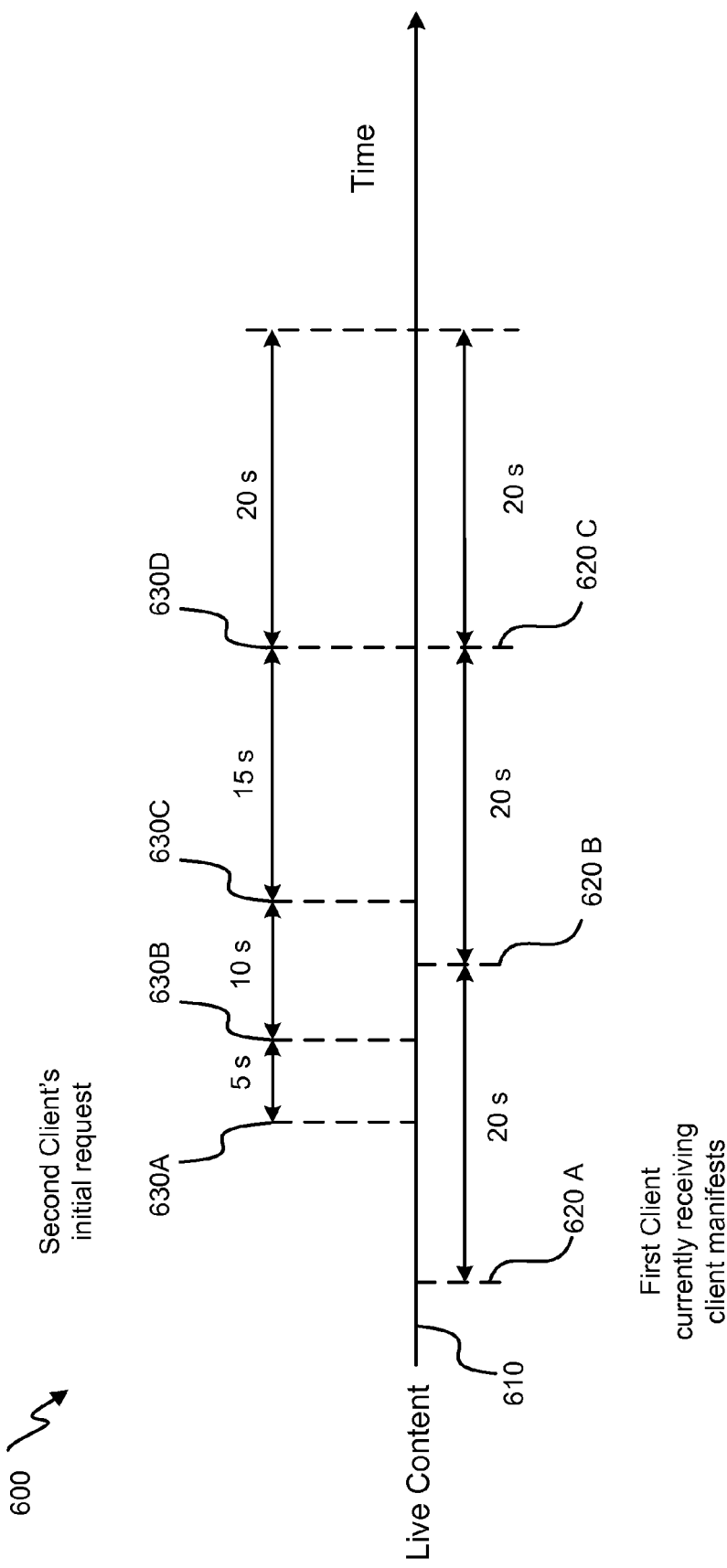
FIG. 6 is a timing diagram illustrating one embodiment of delivering a media stream by manifests of increasing playback duration.

FIG. 6 is a timing diagram 600 illustrating an example of client ramp-up, from the point of view of the CHIMPS 110 or the API 260. The time 610 is with respect to the System Clock 250. A First Client 145 has already been receiving client manifests in response to requests sent to the API 260. Because the First Client 145 has been receiving for a given period of time, its requests are not initial requests, and so the API 260 answers the requests by sending client manifests so that the output of the media stream would have a standard length, in this example 20 seconds. Media content obtained from a client manifest is output in the time interval from 620A to 620B. During this interval, the First Client may send a request for further media content to the CHIMPS 110, and receive another client manifest. Using the new client manifest, the First Client can obtain further requested segments from the MFDSP 150, and process them for output beginning from time 620B to 620C. This process may be continued for as long as the First Client continues to request live media content.

A Second Client, in this example, has sent an initial request to the CHIMPS 110 before time instant 630A. The request is determined to be a first request, and four client manifests are prepared in response. The initial client manifest for the Second Client has links to a relatively small number of requested segments, so that obtaining and processing them for output can be done quickly, and output can begin at time 630A. But the output duration of the media content obtained using the initial client manifest lasts only 5 seconds, from times 630A to 630B. (Additionally and/or alternatively, the initial client manifest for the Second Client may comprise a standard number of requested segments, but the combined output duration of the requested segments still lasts only 5 seconds.) The second client manifest for the Second Client allows the Second Client to obtain requested segments having an output duration of 10 seconds, from times 630B to 630C. During this time interval, the Second Client can use the third client manifest to obtain and process requested segments for output, and the corresponding media is output during the 15 second time interval from 630C to 630D. Finally in this example, the fourth client manifest allows the client to output a live media stream for a duration 20 seconds.

In this example a standard client manifest of the CHIMPS 110 allows for 20 seconds of output to be produced. In additional and/or alternative embodiments of this example, the CHIMPS 110 may subsequently produce client manifests for the Second Client having such standard output durations.

In various embodiments of this example, the four client manifests may be created and sent together for the Second Client to use, or they may be created and sent sequentially to the Second Client. In various embodiments, the ramp-up client manifests sent to the Second Client may be created to have output durations so that subsequent client manifests are synchronized with client manifests delivered to other users. The synchronization of the delivered client manifests may be only with respect to a subset of the other users. As a non-limiting example, desktop clients may be synchronized to have one output duration and timescale, whereas set-top boxes may be synchronized with a different duration and/or timescale.

The embodiments disclosed above may be used by the CHIMPS 110 or other systems to respond individually to requests from multiple clients sending requests at nearly the same time. In some cases, however, it may be that responding with multiple client manifests to multiple clients at nearly the same time may cause a large a burden on the MFDSP 150 to form and supply all the requested segments in the multiple manifests in real time. Previous embodiments may be adapted as follows to accommodate one or multiple clients making requests for live media content at nearly the same time from the CHIMPS 110.

By using standard time values from a System Clock 250, embodiments may be able to apply time offsets to the requested segments that the MFDSP 150 needs to supply to the clients. The various embodiments below preferentially use the method of clock locking discussed above, including using the mapping of timing data with time values obtained from a System Clock 250 as discussed above.

Figure 7:
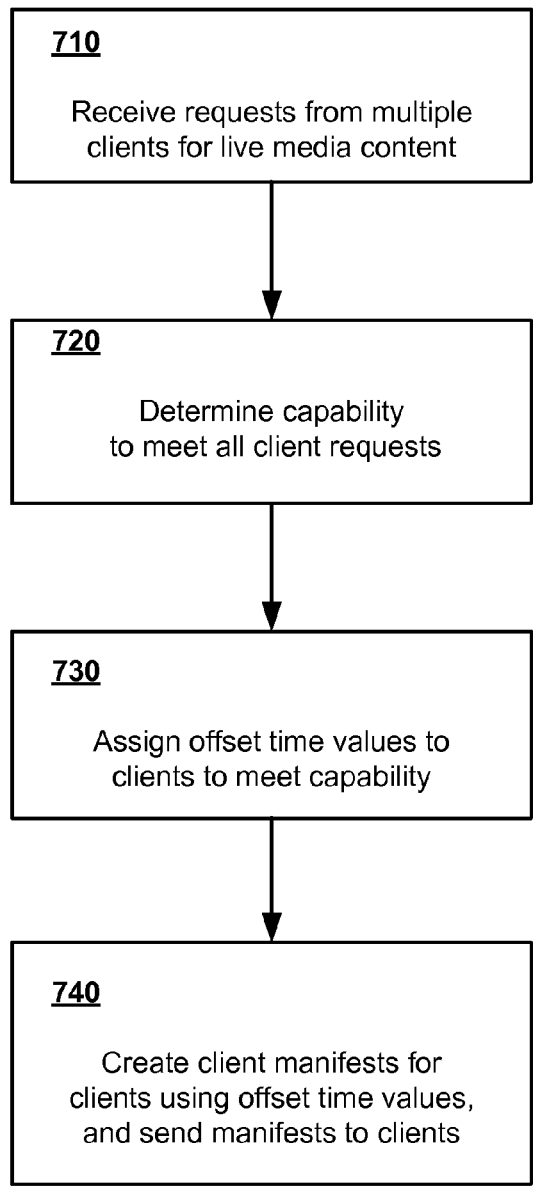
FIG. 7 is a flow chart of a method for delivering live media streaming to multiple devices according to one embodiment.

FIG. 7 is a flow chart of a method by which a system such as the CHIMPS 110 may deliver live media content to multiple Clients 145. Initially the CHIMPS 110 receives, at block 710, multiple requests from a plurality of Clients 145 for live media content. The requests are received near enough in time such that if each Client 145 was provided with the same client manifest, the end user would experience no appreciable delay in the live media content.

However, the CHIMPS 110 may determine, at block 720, that providing the same client manifest to the Clients 145 would result in the Clients 145 sending requests for requested segments of the live media that may not have been fully ingested, transcoded and made available for delivery by the MFDSP 150. One situation in which this might occur is if such a segment has a time value equal to the current time value of the System Clock 250. The interaction between the MFDSP 150 and a DPL 270, and the processing required to form the requested segments, could cause too large a burden on the MFDSP 150. Additionally, the CHIMPS 110 may determine that even if an initial requested segment in a common client manifest was already available at the MFDSP 150, requests from multiple Clients 145 to obtain the same requested segment could also place too large a burden on the MFDSP 150.

In the case of such a determination by the CHIMPS 110, the CHIMPS 110 instead may assign an offset time value, at block 730, to each Client 145. The offset time value assigned to a particular Client 145 may be stored for use in meeting subsequent requests by that Client 145. Various algorithms for assigning offset time values may be used. In some embodiments random numbers determined from a chosen probability distribution on a finite interval may be used.

With offset time values assigned to each of the plurality of Clients 145, the CHIMPS 110 may create, at block 740, respective client manifests for the Clients 145. The offset time value of a Client 145 may be used to determine an amount of time before the current value of the System Clock 250 to use as the time value of an initial requested segment in the respective client manifest. As an illustrative example, if a client is assigned an offset time value of 3 seconds, and the current time value of the System Clock 250 is 11:00:00, then the time value of the initial requested segment in the manifest is chosen as 10:59:57. Upon being sent, at block 740, the client manifest from the CHIMPS 110, the Client 145 requests the initial requested segment from the MFDSP 150. Since the initial requested segment was ingested and processed 3 seconds earlier, the MFDSP 150 most likely has the initial requested segment available for delivery to the Client 145 without needing further processing. While the media content of that requested segment is being output from the client to an end consumer, the subsequent requested segments in the manifest may still be being processed.

The exemplary value of 3 seconds used above for the offset time value is for simplicity of explanation; actual offset time values in various embodiments may have different values and different orders of magnitude. In some embodiments, the offset time values may be restricted to be at most 50 milliseconds. The range of values used for offset time values may be system dependent. In some embodiments of a single system, the range of offset time values used may vary dynamically and may be based on variety of factors, such as the number of Clients 145, the number and complexity of media streams being processed, or other factors. Such variations will be recognized by a person of ordinary skill in the art.

By varying the offset time values assigned to the plurality of clients, the need for simultaneous formation or sending of a single requested segment may be reduced. Though some of the clients may be receiving the live media content with a delay from the true time of occurrence, the result may not be noticed, and the ability to deliver the live media content can be maintained. The method of FIG. 7 may use a variety of probability distributions for assigning the offset time values among several clients. Examples include a beta distribution, a normal distribution, a discretized gamma distribution and a dirichlet distribution. Other examples will be apparent to a person of ordinary skill in the art. A specific example of traffic shaping for multiple clients is now given.

Figure 8A:
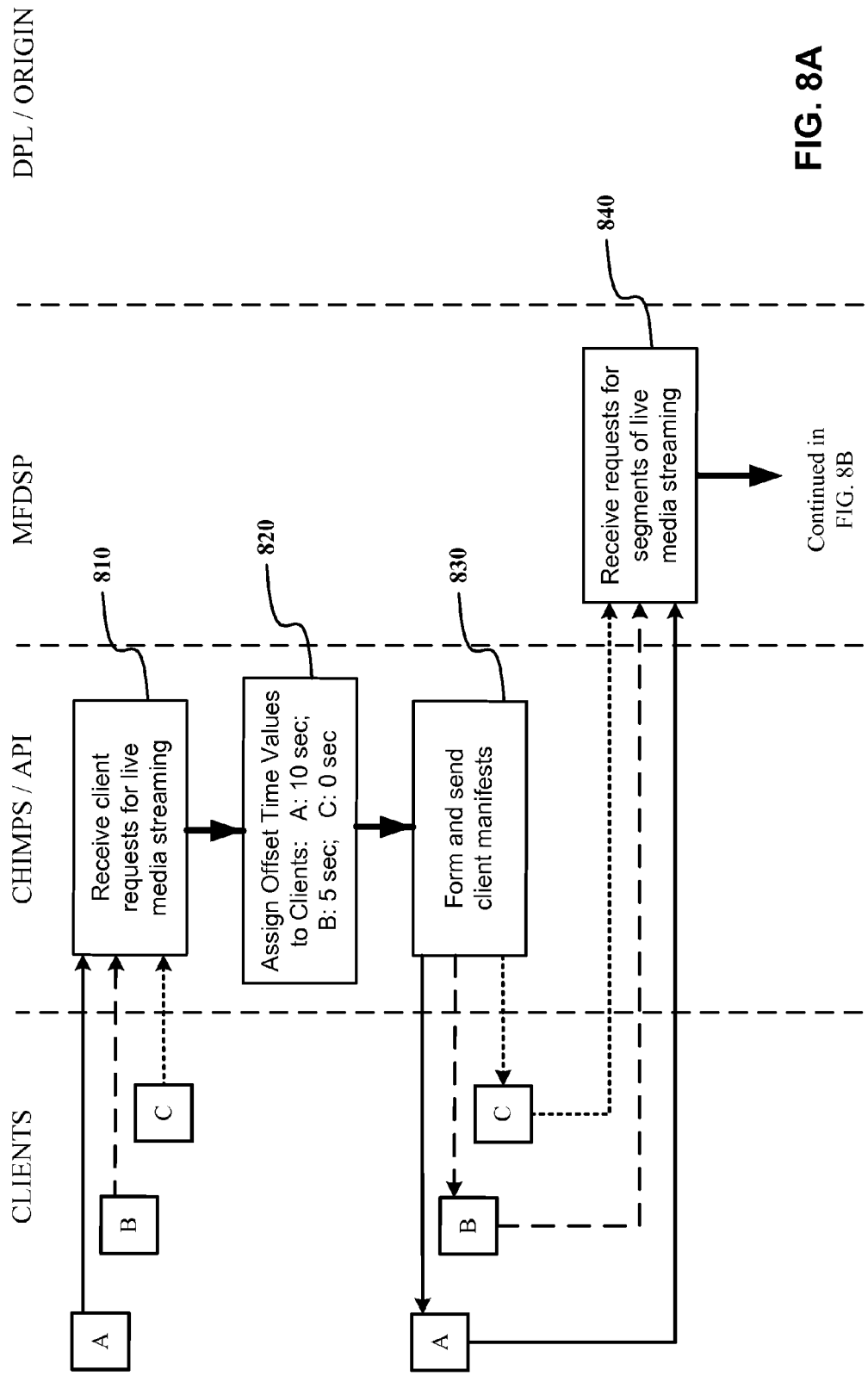
FIGS. 8A and 8B show a swim lane timing diagram illustrating traffic shaping, according to one embodiment.
Figure 8B:
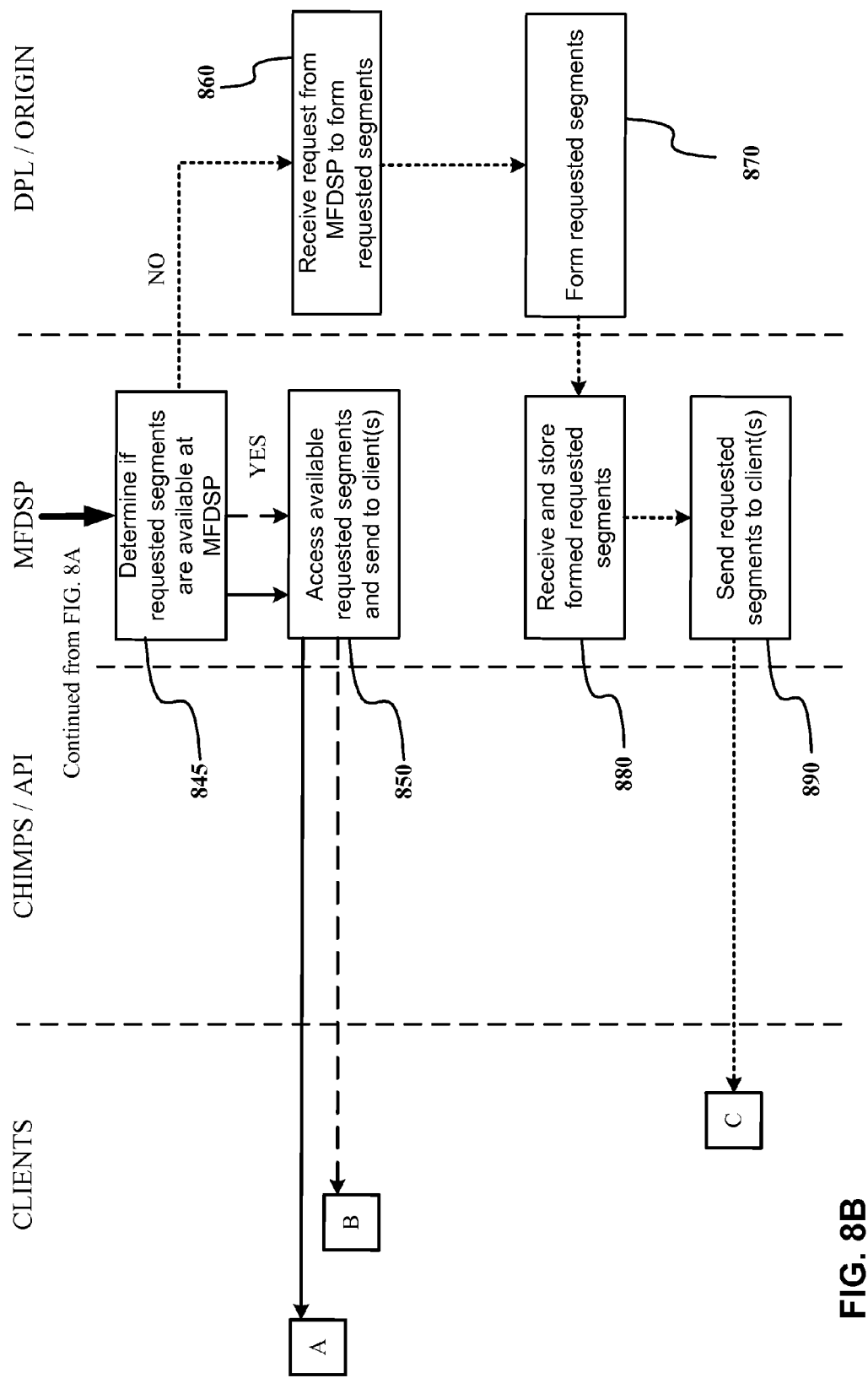

FIG. 8A and FIG. 8B show a swim lane timing diagram of an illustrative example of traffic shaping. The axis of increasing time is downwards. Though only three Clients 145 are shown for simplicity of explanation, one of skill in the art will recognize that actual implementations may involve much larger numbers of clients. At an initial time, three clients (A, B and C) nearly simultaneously send requests to receive client manifests, which are received, at block 810, at the CHIMPS 110 or its API 260. Hereinafter in this example CHIMPS 110 will be used to mean either the CHIMPS 110 or its API 260. The CHIMPS 110 may determine that if identical client manifests were provided to the clients, which were then sent to the MFDSP 150 nearly simultaneously, the MFDSP 150 could be overloaded by needing to form and deliver the same requested segments to all the clients.

In the embodiment shown in this example, at block 820 an offset time value is assigned to each Client 145. For simplicity of explanation, client A is assigned a 10 second offset time value, client B is assigned an offset time value of 5 seconds, and client C is assigned an offset time value of 0 seconds. It will be apparent to one of skill in the art that in an actual implementation the offset time values may have a different order of magnitude.

Using the offset time values assigned to each client, the CHIMPS 110 creates, at block 830, individual client manifests for each client. In an actual embodiment with a very large number of clients, it may be that some of the client manifests (e.g. for clients with the same offset time value) contain the same requested segments to be obtained from the MFDSP 150, and that other manifests may contain different lists of requested segments. In this example, in the client manifest provided to client A, the first requested segment to be retrieved is for media that was received and processed by the CHIMPS 110 at a time 10 seconds earlier. For example, if the time at which the request from A is received is 1:00:00 (i.e.

1 PM), the client manifest provided to client A is for requested segments that have time values (using the mapping) starting with 12:59:50. Similarly, for requests from client B and client C (received at CHIMPS 110, for example, within 0.1 seconds after 1:00:00), the client manifest provided to client B is for requested segments that have time values starting with 12:59:55, and the client manifest provided to client C is for requested segments that have time values starting with 1:00:00. In this example, it is assumed that the time taken for transmission to or from the CHIMPS 110 or MFDSP 150, and the processing needed, take an insignificant amount of time compared to the durations of the media content in the requested segments.

Each client then sends, and the MFDSP 150 receives, at block 840, requests to obtain the requested segment in the respective client manifests that have the earliest time value. The MFDSP determines at block 845 if the respective requested segments are available. Because the requested segment requested by client A has a time value starting with 12:59:50, that requested segment may already have been ingested, transcoded, modified as needed by the DPL and made available for the MFDSP 150 to send. Similarly, the segment requested by client B, with a time value of 12:59:55, is may also already be available to be sent at block 850 by the MFDSP 150.

The requested segment or segments initially requested by client C may not already be available to be sent by the MFDSP 150. In this example, for that situation the MFDSP 150 sends a request, at block 860, to the DPL 270 to form or access from the Origin 240, at block 870, and send back the specific requested segment(s). The requested segment(s) may then be formed or otherwise made available, at block 880, for the MFDSP 150 to send to client C, at block 890.

As the special processing to form the requested segment is needed only for client C, the overall processing burden on the MFDSP 150 and the DPL 270 and/or Origin 240 is reduced. With a reduced burden, a time delay needed for the processing may be minimized, and client C may obtain the live media content without noticeable delay.

All the clients may then continue to request and receive the live media content given in their respective client manifests. As the respective client manifests also comprise links for subsequent requested segments determined by the assigned offset time values, each client may continue to receive the live media content continuously.

Figure 9:
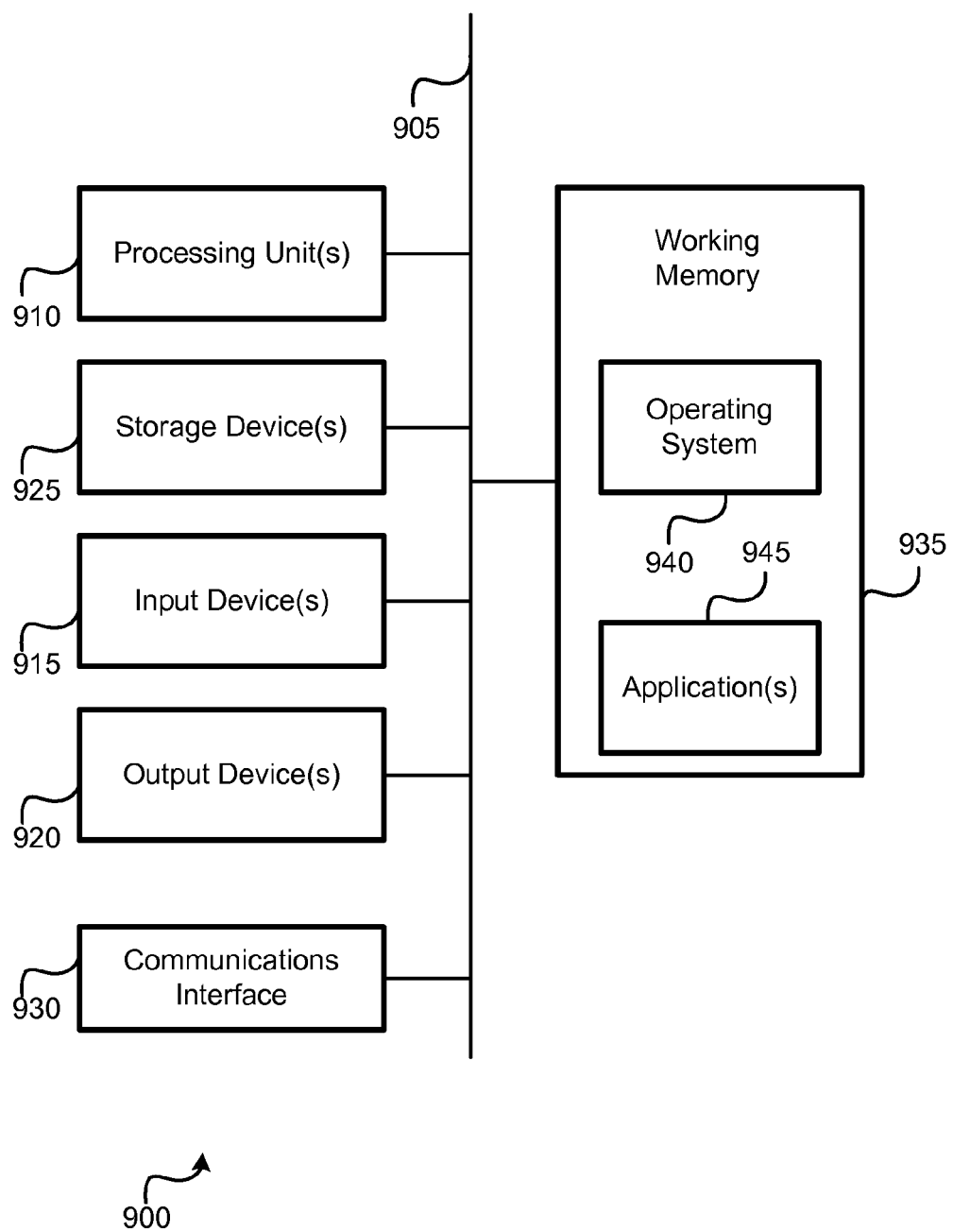
FIG. 9 is a block diagram of an embodiment of a computer system.

FIG. 9 illustrates an embodiment of a computer system 900, which may be configured to execute various components described herein using any combination of hardware and/or software. For example, the computer system 900 can be configured to execute the API 260, client 145, and/or other components of the CHIMPS 110 and/or Media Servicing System 100, as described herein. FIG. 9 provides a schematic illustration of one embodiment of a computer system 900 that can perform the methods provided by various other embodiments, such as the methods described in relation to FIGS. 3-8. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different physical locations.

The computer system 900 is shown comprising hardware elements that can be electrically coupled via a bus 905 (or may otherwise be in communication, as appropriate). The hardware elements may include processing unit(s) 910, which can include without limitation one or more general-purpose processors, one or more special-purpose processors (such as digital signal processing chips, graphics acceleration processors, and/or the like), and/or other processing structure, which can be configured to perform one or more of the methods described herein by, for example, executing commands stored in a memory. The computer system 900 also can include one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 can also include a communications interface 930, which can include wireless and wired communication technologies. Accordingly, the communications interface can include a modem, a network card (wireless or wired), an infrared communication device, a wireless communication device, and/or a chipset (such as a Bluetooth™ device, an IEEE 802.11 device, an IEEE 802.15.4 device, a WiFi™ device, a WiMax device, cellular communication facilities, UWB interface, etc.), and/or the like. The communications interface 930 can therefore permit the computer system 900 to be exchanged with other devices and components of a network.

In many embodiments, the computer system 900 will further comprise a working memory 935, which can include a RAM or ROM device, as described above. Software elements, shown as being located within the working memory 935, can include an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the methods discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a non-volatile computer-readable medium such as a storage medium. Processors may perform the necessary tasks.

What is claimed is:

1. A method of providing live media streaming via a data communications network, the method comprising: receiving a stream of data representing live media content, the stream of data comprising a plurality of source segments; accessing timing data of each of the received plurality of source segments of the stream of data; creating a mapping that provides an association of the timing data of the received plurality of source segments to time values obtained from a system clock, wherein the mapping associates the timing data of each of the received plurality of source segments to the time value of the system clock at the time the source segment was received; transcoding the plurality of received source segments to form transcoded segments and storing the transcoded segments in memory; receiving requests from a plurality of clients to receive live media content; assigning a respective offset time value to each of the plurality of clients, wherein at least two offset time values are different; forming, for each client of the plurality of clients, a respective client manifest based on the offset time value assigned to the client, the respective client manifest enabling the client to obtain requested segments of the live media content that have time values according to the mapping that are offset from the value of the system clock by the respective offset time value assigned to the respective client; and sending the client manifests to the respective clients via the data communications network.

2. The method of providing live media streaming via a data communications network of claim 1, wherein the client manifests comprise information that enables the respective clients to obtain the requested segments for the requested live media content from a media file delivery service provider (MFDSP).

3. The method of providing live media streaming via a data communications network of claim 2, further comprising assigning the respective offset time values so that processing needed by the MFDSP to provide the requested segments is reduced.

4. The method of providing live media streaming via a data communications network of claim 1, wherein sending the client manifest to at least one of the plurality of clients uses an application program interface.

5. The method of providing live media streaming via a data communications network of claim 2, further comprising storing at the MFDSP the requested segments obtained from at least one client manifest.

6. The method of providing live media streaming via a data communications network of claim 1, wherein forming a client manifest for a first client of the plurality of clients may be implemented by retrieving a stored client manifest that was formed for a second client of the plurality of clients.

7. The method of providing live media streaming via a data communications network of claim 1 further comprising forming a requested segment from at least one stored transcoded segment in response to a request from the MFDSP, and sending the formed requested segment to the MFDSP.

8. A server system for providing live media streaming via a data communications network, the system comprising: one or more processors; and memory comprising instructions that when executed by a combination of the one or more processors causes the combination of processors to: receive a stream of data representing live media content, the stream of data comprising a plurality of source segments; access timing data of each of the received plurality of source segments of the stream of data; create a mapping that provides an association of the timing data of the received plurality of source segments to time values obtained from a system clock, wherein the mapping associates the timing data of each of the received plurality of source segments to the time value of the system clock at the time the source segment was received; transcode the plurality of received source segments to form transcoded segments and store the transcoded segments; receive requests from a plurality of clients to receive live media content; assign a respective offset time value to each of the plurality of clients, wherein at least two offset time values are different; form, for each client of the plurality of clients, a respective client manifest based on the offset time value assigned to the client, the respective client manifest enabling the client to obtain requested segments of the live media content that have time values according to the mapping that are offset from the value of the system clock by the respective offset time value assigned to the respective client; and send the client manifests to the respective clients via the data communications network.

9. The server system for providing live media streaming via a data communications network of claim 8, wherein the client manifests comprise information that enables the respective clients to obtain the requested segments for the requested live media content from a media file delivery service provider (MFDSP).

10. The server system for providing live media streaming via a data communications network of claim 9, wherein the respective offset time values are assigned so that processing needed by the MFDSP to provide the requested segments is reduced.

11. The server system for providing live media streaming via a data communications network of claim 8, wherein sending the client manifest to at least one of the plurality of clients uses an application program interface.

12. The server system for providing live media streaming via a data communications network of claim 9, further comprising storing at the MFDSP the requested segments obtained from at least one client manifest.

13. The server system for providing live media streaming via a data communications network of claim 8, wherein forming a client manifest for a first client of the plurality of clients may be implemented by retrieving a stored client manifest that was formed for a second client of the plurality of clients.

14. The server system for providing live media streaming via a data communications network of claim 9 further comprising forming a requested segment from at least one stored transcoded segment in response to a request from the MFDSP, and sending the formed requested segment to the MFDSP.

15. A computer program product embodied on a nontransitory computer-readable medium and comprising code that, when executed, causes one or more processors to: receive via a data communications network a stream of data representing live media content, the stream of data comprising a plurality of source segments; access timing data of each of the received plurality of source segments of the stream of data; create a mapping that provides an association of the timing data of the received plurality of source segments to time values obtained from a system clock, wherein the mapping associates the timing data of each of the received plurality of source segments to the time value of the system clock at the time the source segment was received; transcode the received plurality of source segments to form transcoded segments and storing the transcoded segments in memory; receive requests from a plurality of clients to receive live media content; assign a respective offset time value to each of the plurality of clients, wherein at least two offset time values are different; form, for each client of the plurality of clients, a respective client manifest based on the offset time value assigned to the client, the respective client manifest comprising information enabling the client to obtain requested segments of the live media content that have time values according to the mapping that are offset from the value of the system clock by the respective offset time value assigned to the respective client; and send the client manifests to the respective clients via the data communications network.

16. The computer program product of claim 15, wherein the information in each client manifest enables the respective client to obtain the requested segments of the live media content from a media file delivery service provider, and wherein the respective offset time values are assigned so that the processing needed by the MFDSP to provide the requested segments is reduced.

17. The computer program product of claim 15, wherein forming a client manifest for a first client of the plurality of clients may be implemented by retrieving a stored client manifest that was formed for a second client of the plurality of clients.

18. The computer program product of claim 16, wherein the code causes the one or more processors to form a requested segment from at least one stored transcoded segment in response to a request from the MFDSP, and sending the formed requested segment to the MFDSP.

* * * * *